United States Patent [19]

von Kozierowski

[11] Patent Number: 4,976,395
[45] Date of Patent: Dec. 11, 1990

[54] HEAVIER-THAN-AIR DISK-TYPE AIRCRAFT

[76] Inventor: Joachim von Kozierowski, Zum Darloh 5, D-5982 Neuenrade 4, Fed. Rep. of Germany

[21] Appl. No.: 235,592

[22] Filed: Aug. 24, 1988

[30] Foreign Application Priority Data

Aug. 24, 1987 [DE] Fed. Rep. of Germany ....... 3728153

[51] Int. Cl.⁵ .............................................. B64C 39/06
[52] U.S. Cl. .................................. 244/12.2; 244/23 C
[58] Field of Search .................. 244/12.2, 23 C, 23 A, 244/23 R; 60/39.34, 39.35, 39.43, 39.75; 416/175, 182, 179, 183

[56] References Cited

U.S. PATENT DOCUMENTS

| | | | |
|---|---|---|---|
| 906,244 | 12/1908 | Ljungstrom | 416/178 |
| 2,988,303 | 6/1961 | Coanda | 244/23 C |
| 3,024,966 | 3/1962 | Frost | 60/39.75 |
| 3,123,320 | 3/1964 | Slaughter | 244/12.2 |
| 3,200,588 | 8/1965 | Math | 60/39.34 |
| 3,404,853 | 10/1968 | Miller | 60/39.75 |
| 3,519,224 | 7/1970 | Boyd et al. | 244/23 C |
| 4,023,751 | 5/1977 | Richard | 244/23 C |
| 4,193,568 | 3/1980 | Heuvel | 60/39.35 |
| 4,521,154 | 6/1985 | Corbett | 416/175 |

Primary Examiner—Galen Barefoot
Attorney, Agent, or Firm—Pollock, Vande Sande & Priddy

[57] ABSTRACT

Vertically starting and landing centrifugal toric ring shape, transport capsules for movement in any desired medium. The capsules consist of circular ring shells, arranged above or inside each other, and rotating concentrically at a distance around a central axis. Each circular ring shell consists of compressor blades (1) and turbine blades (2), arranged side-by-side on a circular ring and connected to each other by means of separator rings (4) and bearing rings, and which have one or several energy aggregates which drive the circular ring shells, so that the surrounding medium is taken up by the circular ring shells, accelerated and again expelled through nozzles (10), whereby the centrifugal ring itself is held rotationally stable with respect to the center axis by an electronically controlled braking device (14) on the counter-running shells or by means of nozzles or through a projecting torque support.

4 Claims, 5 Drawing Sheets 4,976,395

HEAVIER-THAN-AIR DISK-TYPE AIRCRAFT

FIELD OF THE INVENTION

The invention relates to a heavier-than-air disk-type aircraft, which is substantially symmetrical about a vertical axis and which can take off and land vertically.

BACKGROUND OF THE INVENTION

Such an aircraft is known per se, and normally consists of a structure which embodies rotating turbines, as disclosed, for example, in U.S. Pat. Nos. 3,024,966 and 4,193,568, or of a disk-type structure which contains a centrifugal blower driven by a central shaft and which moves air from an intake slot toward a discharge slot, as disclosed in U.S. Pat. No. 3,123,320.

The prior art disk-type aircraft have compressor blades arranged annularly and mounted radially, so that the air inlet is close to the center of the aircraft, where the air is led downwards through the relatively small inlet. Due to this technique it is hardly possible to make an economic modular design of a disk-like aircraft.

SUMMARY OF THE INVENTION

The object of the invention is a disk-type aircraft consisting of a controlled non-rotatable, permeable, driving centrifugal ring into the center of which transport or passenger cabins are interchangeably hooked.

For the solution of this problem, the invention provides that, on a circular ring related to a center axis, blades which are straight or bent along their longitudinal axes are arranged at intervals next to each other, thus forming a circular ring shell. Other circular ring shells are arranged concentrically to each other, without touching, above each other or inside each other. These shells are rotatably driven by one or several energy aggregates, and thus take in the surrounding medium which, depending on its type, is compressed and/or accelerated and expelled. One or several stabilizers hold the permeable housing rotationally stable with respect to the center axis, and thus form a torus-like body, freely moving through a medium, into the center of which transport or passenger cabins are exchangeably hooked.

This has the effect, compared to the closest state of the art, that through the annular arrangement of the blade shells a stabilizing centrifugal force and a large amount of accelerated medium is provided, which medium, led over adjustment nozzles or control panels, puts the centrifugal ring into motion and stabilizes it.

The ring itself is rotationally stable with respect to its center axis, since it is held by means of an electronically controlled braking device on the counter-rotating shells or through nozzles or through a projecting torque support.

It is thus possible to locate interchangeable passenger cabins in the center of the centrifugal ring.

Due to the relatively great thrust forces attained by the centrifugal ring based on the large air flow through its permeable outer skin, and due to the stabilizing centrifugal force from the rotation of the shells as well as the arrangement of the adjustment nozzles, vertical take-off, landing, and holding in position in the air is possible.

On the basis of the air absorption over the greatest part of the outer skin, and of the relatively flat construction, there is a favorable air resistance value for flight in a radial direction.

The large surfaces across which air is absorbed favor flight at a high altitude in thin air.

When flying in axial direction and during vertical landing the air resistance value produced by the large circular ring surface helps to reduce speed. This effect is enhanced by the hooked in center capsule.

Through the electronic control the passenger capsule can always be positioned during flight in such a manner that the passengers are pressed into their seats during acceleration and decelerations.

The concept of the invention is also applicable to use of the centrifugal ring in water, where it can serve for the transport of bathyspheres.

BRIEF DESCRIPTION OF THE DRAWINGS

In order that the invention may be more clearly understood, it will now be described with reference to the accompanying drawings, wherein several embodiments of the invention are described for purposes of illustration and wherein.

DESCRIPTION OF PREFERRED EMBODIMENTS

Figure 1:
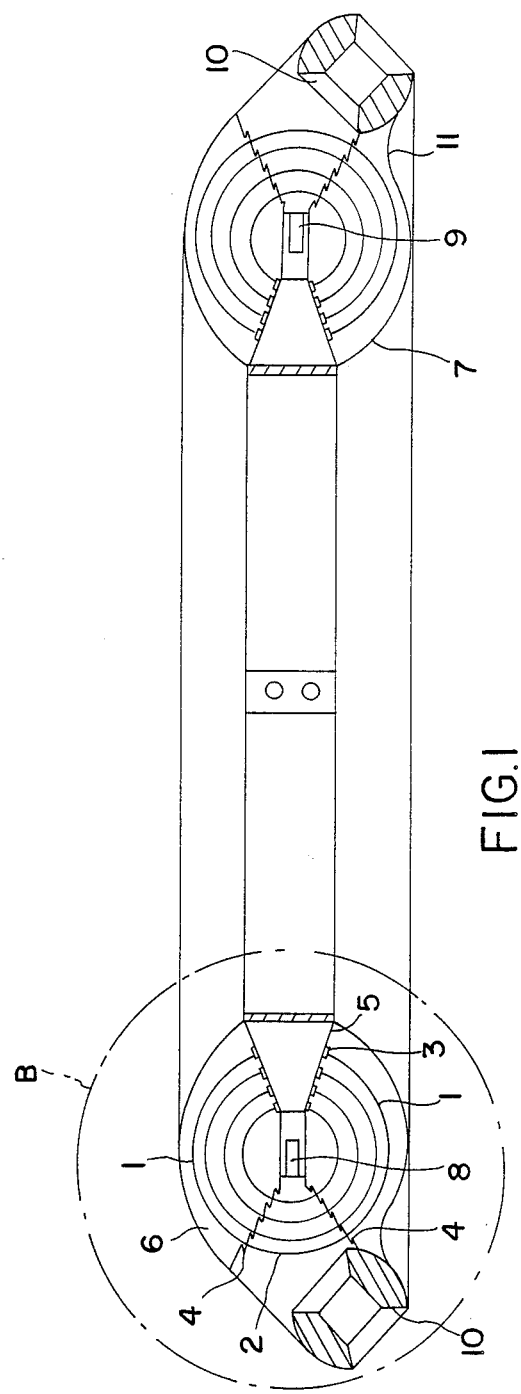
FIG. 1 is a cross section through a front elevation view of a first embodiment of the centrifugal ring along line A—A of FIG. 2, with two compressors sides.

On the periphery related to the center line of the centrifugal ring, upper and lower compressor blades 1, arranged next to each other, form with turbine blades 2 a torus-like shell above bearing rings 3 and separator rings 4 arranged concentrically around the center of the centrifugal ring.

The shells, rotating on runway 5 around the center axis of the centrifugal ring, compress with their compressor blades 1 the air air entering through the outer skin areas 6, 7 (shown schematically in FIG. 3), which are permeable to the medium so as to provide sufficient flow to the turbines, yet act as a barrier to the entry of undesirable matter. This air is accelerated by combustion chambers 8 and gas turbines 9 arranged along the circumference. The hot gas drives the shell via the turbine blades 2.

The medium guided across the turbine blades 2 of the centrifugal ring is expelled through downstream adjustment nozzles 10, which may be equipped with afterburners, so that the centrifugal ring is propelled in the selected direction by reverse thrust. The outer skin area 11 is also permeable to the medium.

Figure 2:
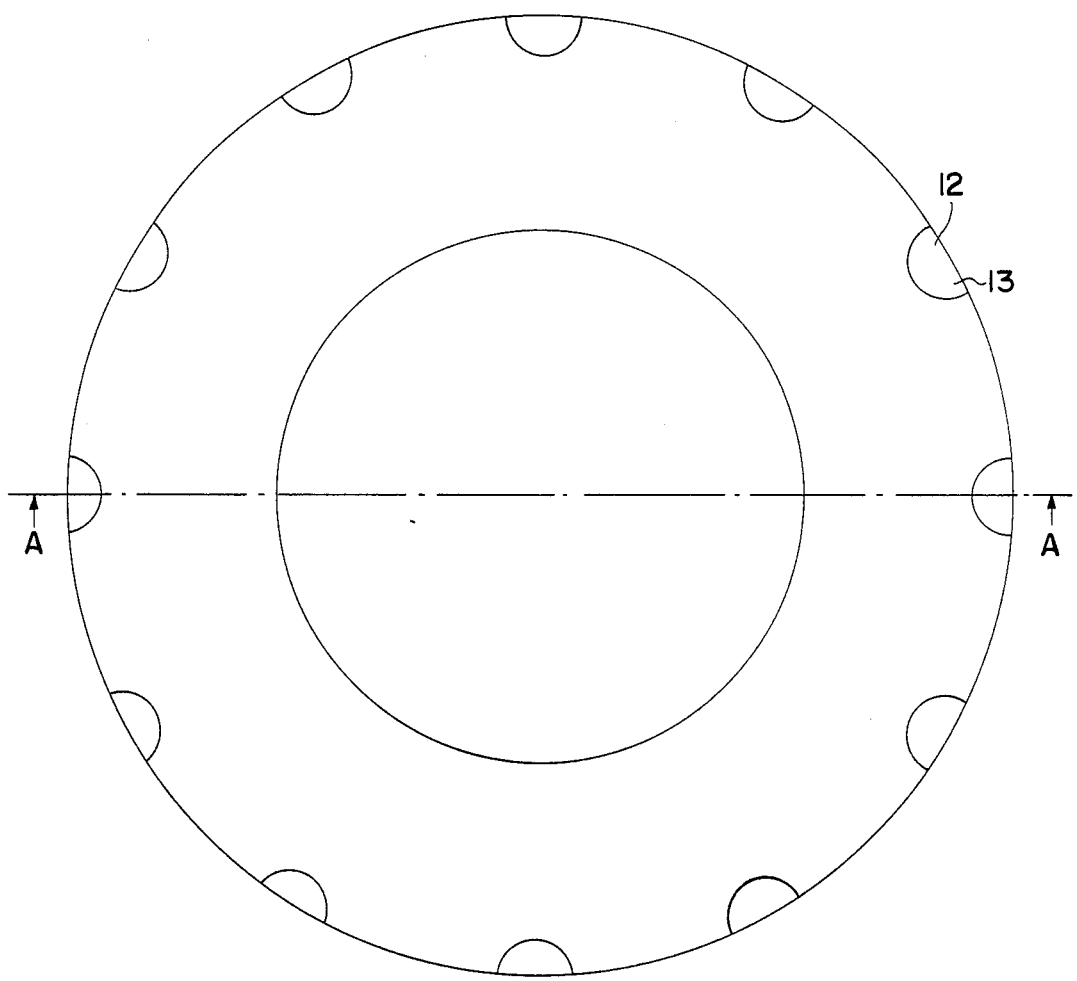
FIG. 2 is a top plan view of the first embodiment of the centrifugal ring.

In FIG. 2, positions 12, 13 represent sliding separations which automatically open and close the apertures of the propulsion nozzles.

Figure 3:
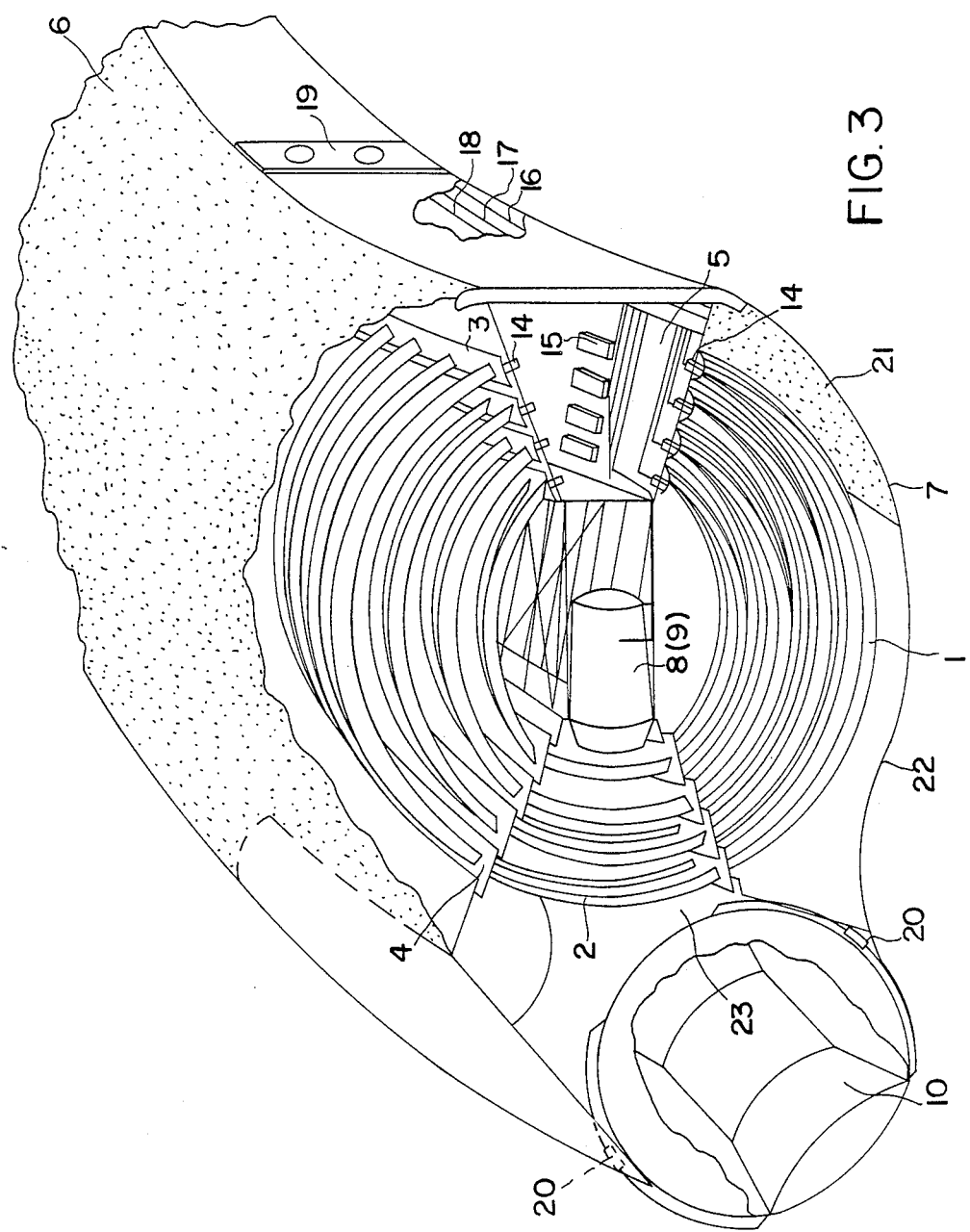
FIG. 3 is a perspective section view of the centrifugal ring along line B of FIG. 1.

In FIG. 3, the counter-running shells each consist of compressor blades 1 and turbine blades 2, arranged behind each other and attached at intervals next to each other on two concentric bearing rings 3 and connected to each other by two separator rings 4, and being driven by the accelerated medium of the combustion chambers 8 and/or gas turbines 9 arranged on the periphery.

The electronically controlled adjustment nozzles 10, mounted downstream of the combustion chambers 8 and/or gas turbines 9, which can be equipped with afterburners, produce the reverse thrust power needed for the motion and control of the centrifugal ring.

The counter-rotating, air cushion supported shells have contact and guidance with the electronically controlled braking wheels 14, mounted on the periphery, by means of which the rotation stability is attained in cooperation with the adjustment nozzles 10.

The air pressure between bearing ring 3 and runway 5 is regulated by means of electronically controlled pneumatic valves 15 which receive the compressed air from the compressor.

Data transmissions and fuel supply pass through lines 16 and 17. The compressed air distribution proceeds through line 18. All three lines 16, 17, 18 are connected through couplings in the docking column 19 to the transport capsule hooked into the center.

The electronically controlled servomotors 20 bring the peripherally mounted nozzles 10 into the desired position.

The air intake by the lower blades proceeds through bypass next to the chambers 23 and throught the permeable sheet metal housing 21.

The sheet metal 22 is selectively air-permeable or air impermeable.

Figure 4:
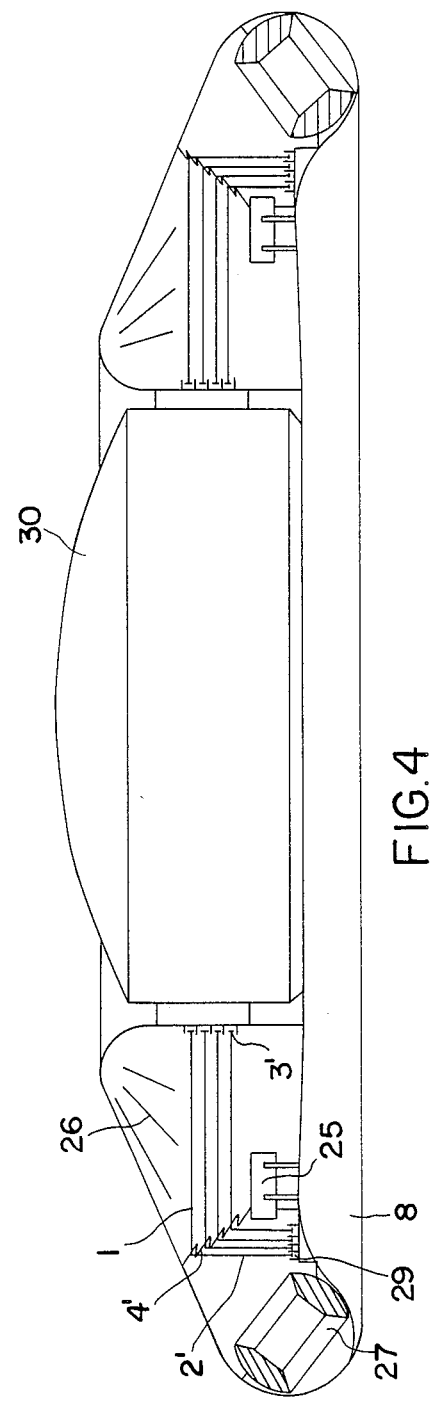
FIG. 4 is a cross section through a front elevation view of a second embodiment of the centrifugal ring, with angled shells consisting of straight compressor and turbine blades and only one compressor side.

In FIG. 4, the compressor blades 1, arranged at right angles to the centerline of the centrifugal ring, arranged on the circle circumference, relative to the center line of the centrifugal ring, form, together with the turbine blades 2' arranged parallel to the center line on the periphery and the joint separator ring 4', a circular ring shell with bearing rings 3', 29. The radially inner portions of blades 2' are supported in upper bearing rings 3', while the lower portions of blades 2' are supported in lower bearing rings 29. This arrangement provides additional rigidity to the structure.

Other shells of scaled down size are concentrically arranged above each other without contact and are driven in opposite direction by the energy aggregate 25 through the turbine blades of the circular ring shells. The compressor blades of the circular ring shells take up the surrounding medium through openings in the outer skin 26.

The medium guided across the turbine blades of the centrifugal ring is expelled through the downstream adjustment nozzles 27, which may be equipped with afterburners, so that the centrifugal ring with the centrally hooked in, interchangeable capsule 30 is pushed by reverse thrust into the desired direction.

The lower housing side of the centrifugal ring 28 is impermeable to the medium.

Figure 5:
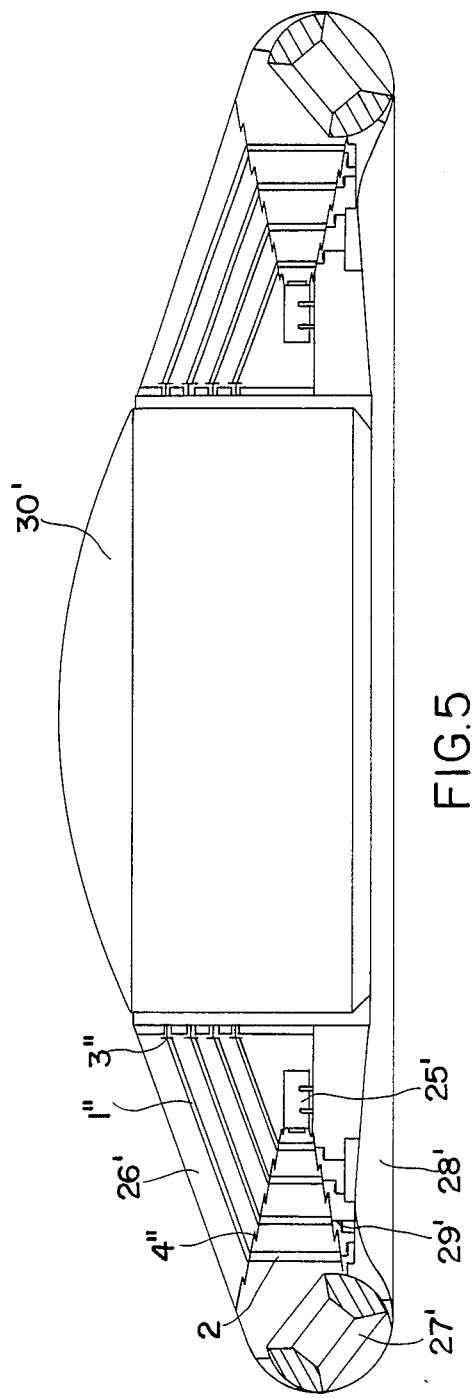
FIG. 5 is a cross section through a front view of a third embodiment of the centrifugal ring, with straight shells, consisting of compressor blades placed behind each other in a straight line, and turbine blades with only one compressor side.

In FIG. 5, the compressor blades 1" and turbine blades 2", arranged side-by-side at intervals, inclined toward the centerline and connected to each other by the separator ring 4", arranged on the circle circumference, relative to the center line of the centrifugal ring, form a circular ring shell with bearing rings 3", 29'.

Other shells of scaled down size are concentrically arranged above each other without contact and are driven in opposite directions by the energy aggregate 25' through the turbine blades of the circular ring shells, whereby the compressor blades of the circular ring shells take in the surrounding medium through openings 26' in the outer skin.

The medium guided across the turbine blades of the centrifugal ring is expelled through the adjustment nozzles 27', mounted downstream, which may be equipped with afterburners, so that the centrifugal ring with the centrally hooked in, interchangeable capsule 30' is pushed by reverse thrust into the desired direction.

The lower housing side of the centrifugal ring 28' is impermeable to the medium.

What is claimed is:

1. Circular centrifugal transport ring comprising spaced blades located side-by-side relative to a center axis of said ring, each of said blades comprising a plurality of compressor blades (1) and a turbine blade (2), said blades being connected to each other through at least one separator ring (4) to form a circular ring shell with bearing rings, other circular ring shells being arranged concentrically with adjacent circular ring shells without contact, above each other or inside each other, an energy aggregate being housed in an innermost one of said circular ring shells, said energy aggregate inducing a relatively or absolutely opposite rotation of the circular ring shells, so that the surrounding medium is taken in by the circular ring shells, accelerated and expelled through guide means, whereby the housing of the centrifugal ring itself is held rotationally stable with respect to the center axis and a torus-like body is formed for receiving in a center thereof interchangeable transport cabins hooked thereinto.

2. Centrifugal ring according to claim 1, wherein the adjustment nozzles are pivotably attached at the diameter of the centrifugal ring, and the centrifugal ring obtains vertical lift by adjustment in axial direction and can take off and land vertically.

3. Centrifugal ring according to claim 1, wherein the outer housing and the at least one capsule centrally and interchangeably docked thereto is rotatable and positionable as desired relative to the center axis.

4. Centrifugal ring according to claim 2, wherein the outer housing and the at least one capsule centrally and interchangeably docked thereto is rotatable and positionable as desired relative to the center axis.

* * * * *